United States Patent Office 3,265,337
Patented August 9, 1966

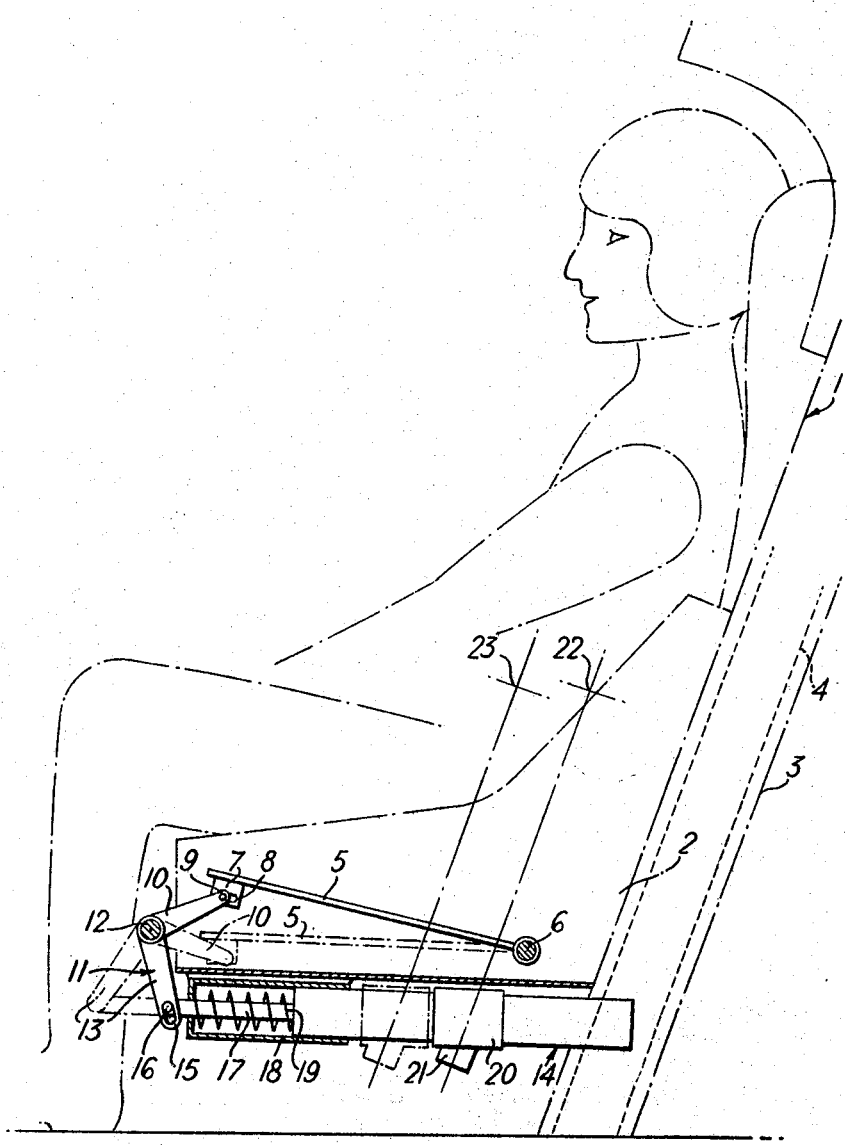

3,265,337
EJECTION OF AIRMEN FROM AIRCRAFT
James Martin, Southlands Manor, Denham, near Uxbridge, Middlesex, England
Filed Nov. 30, 1964, Ser. No. 414,667
Claims priority, application Great Britain, Dec. 3, 1963, 47,594/63
10 Claims. (Cl. 244—122)

This invention concerns the ejection of an airman and his seat from an aircraft.

Aircraft ejection seats usually comprise a seat pan mounted on a beam or frame (both hereinafter called, for convenience, a "seat frame") adapted to be ejected with the seat pan bodily along a predetermined path from the aircraft, ejection means being provided to project the ejection seat from the aircraft in a predetermined direction relatively thereto as and when required as, for example, in an emergency either in the air or at ground level.

In aircraft ejection seats successfully adopted in practice in the past, ejection of the seat from the aircraft has been effected by means of an ejection gun comprising two or more telescopically co-operating parts adapted to be thrust axially apart by propulsion gases generated by the firing of at least one combustible cartridge, such gun operating between the seat frame and a fixed part of the aircraft and being located in such a position as to exert the thrust in the direction that it is desired that the ejection seat should travel as it moves from the aircraft. The well known Martin-Baker aircraft ejection seats are of this character and are described in, amongst others, the specifications of Patent Nos. 2,467,763; 2,527,020; 2,569,638; and 2,708,083.

When an ejection seat/airman combination is ejected from an aircraft in an emergency it is extremely desirable that the seat/airman combination should obtain a high velocity in the predetermined direction in as short a time as possible consistent with the application of physiologically acceptable acceleration values to the airman: that is to say, it is important that the trajectory of the seat/airman combination relative to the aircraft flight path at the time of ejection shoud be such that the combination will adequately clear parts of the aircraft, such as the empennage, in any flight condition and especially at high aircraft speeds and/or when ejection occurs during a dive. It is also vital that the seat/airman combination should have a trajectory of adequate height and duration to afford sufficient time for the deployment and effective operation of the airman's parachute or parachutes by which his subsequent descent is controlled when ejection takes place at low aircraft speeds and altitude (for instance at zero aircraft speed and zero altitude).

The ejection gun of an ejection seat of the above described character can only produce an effective accelerating thrust during the time that the telescopically co-operating parts of the gun are interengaged. This means that the ejection gun must produce a very high short term acceleration in order to achieve a high seat/airman combination velocity and, accordingly, the maximum attainable velocity is limited by the maximum acceleration value that can safely be applied to the airman by the operation of the ejection gun.

With the object of endeavouring to attain higher velocities without imposing unacceptable accelerations upon the airman, it has been proposed to provide an ejection seat of the character described with a rocket motor which provides an accelerating thrust for increasing the seat/airman combination velocity beyond that attained by the action of the ejection gun. In such proposal, the rocket motor was incorporated in the ejection gun on the seat frame and, since the axis of the ejection gun did not extend through the centre of gravity of the seat/airman combination, the exhaust outlet of the rocket motor was inclined with respect to the ejection gun axis so that the thrust line of the rocket motor extended upwardly and forwardly approximately through the centre of gravity of the combination and was thus inclined to the initial movement of the seat relatively to the aircraft in the direction of the ejection gun axis. It will be understood that, unless the thrust line of the rocket motor extends substantially through the centre of gravity of the combination, the rocket motor thrust will apply an undesired pitching moment to the combination.

Because the rocket motor thrust line of the aforesaid prior proposal was inclined to the initial trajectory of the seat/airman combination resulting from the action of the ejection gun, the initial trajectory of the combination would not be maintained but, instead the initial trajectory would be modified by the rocket motor thrust so as to have a forward velocity component. In high speed level flight of the aircraft at the moment of ejection, such forward velocity component of the seat/airman combination could have been advantageous in assisting the combination to clear a high empennage but, in other circumstances, particularly at low speeds near the ground and with the aircraft in a nose-down attitude, the forward velocity component could have resulted in the combination being propelled towards the ground.

With the object of avoiding these important disadvantages of the aforesaid prior proposal, I have devised, and described and claimed in the specification of my copending patent application Ser. No. 150,670, an ejection system for ejecting an ejection seat/airman combination from an aircraft, comprising an ejection gun for effecting initial ejection of the combination from the aircraft in a predetermined direction relatively to the aircraft, and at least one rocket motor independent of said ejection gun for accelerating the combination in said predetermined direction by producing a thrust vector aligned or substantially aligned with said predetermined direction and extending through or substantially through the centre of gravity of the combination. In the embodiments described in my said specification, the thrust line of the rocket motor is fixed in orientation and also in position, its position being calculated on the basis of a prediction of the position for the centre of gravity of the seat/airman combination when this combination includes an airman of "average" weight, stature and proportions.

As has been explained, if the thrust line of the rocket motor does not extend substantially through the actual centre of gravity of the seat/airman combination, the rocket motor thrust produces an undesired pitching moment acting on the combination. With a fixed rocket motor thrust line, such an undesired pitching moment can result from variations of the position of the actual centre of gravity of the seat/airman combination from that assumed in calculating the orientation and position of the rocket motor thrust line. It will be understood that the actual position of the centre of gravity of any particular seat/airman combination depends on the weight of the airman, his stature and proportions, the nature and distribution of personal equipment worn or carried by the airman, and the position of the seat pan on the seat frame, which position is usually adjustable to enable the airman to set his eye level at a convenient height, and although the centre of gravity will ordinarily be found in practice to lie fairly close to that predicted on the basis of an "average" airman, nevertheless in some cases the actual position will be significantly displaced from the predicted position to lead to undesirable destabilising forces on the combination during ejection.

Therefore, in the complete specification of my copending patent application Ser. No. 150,670, I have described and claimed, inter alia, an ejection system for ejecting an ejection seat/airman combination from an aircraft, comprising an ejection gun for effecting initial ejection of the combination from the aircraft in a predetermined direction relatively to the aircraft and at least one rocket motor independent of said ejection gun for accelerating the combination in said predetermined direction by producing a thrust vector aligned or substantially aligned with said predetermined direction and means for adjusting the position of the thrust line of the rocket motor with respect to the ejection seat, whilst maintaining the orientation of the thrust line with respect to said predetermined direction, to enable such thrust line to be set to extend through or substantially through the centre of gravity of the combination.

In the embodiments described in this latter specification, the means for adjusting the position of the thrust line are manually-operable and are intended to be checked and/or operated by the airman, as part of his pre-flight activities, to ensure that the position of the thrust line is suited to his use of the ejection seat.

However, in view of the complexity of modern aircraft and the consequential multiplicity of essential tasks to be undertaken by an airman before flight, there is an ever present risk that checking and/or re-setting the adjustment of the position of the thrust line will be overlooked. In a case where there is considerable disparity between the weights, stature and proportions of successive airmen using a particular ejection seat, the position of the thrust line, set for one airman, may be considerably removed from the correct position for the next airman using the seat without adjustment, and in these circumstances ejection could be made very dangerous and possibly fatal.

Still further, although with the particular embodiments described in my latter specification, it is possible to very accurately set the position of the thrust line, it will be appreciated that no account can be taken of any displacement of the position of the centre of gravity of the ejection seat/airman combination from that assumed in making the adjustment of the thrust line position, for example as a result of the airman not adopting the correct position in his seat at the instant of ejection.

Thus one object of the present invention is to provide an ejection system as disclosed and claimed in the complete specification of my said co-pending patent application Ser. No. 150,670 with modifications such that the present-day requirements are more nearly met than in the case of the embodiments particularly described in said specification.

According to this invention there is provided an ejection system for ejecting an ejection seat/airman combination from an aircraft, comprising an ejection gun for effecting initial ejection of the combination from the aircraft in a predetermined direction relatively to the aircraft and at least one rocket motor independent of said ejection gun for accelerating the combination in said predetermined direction by producing a thrust vector aligned or substantially aligned with said predetermined direction and means responsive to the weight and position of the centre of gravity of the airman during ejection of the combination for automatically adjusting the position of the thrust line of the rocket motor with respect to the ejection seat, whilst maintaining the orientation of the thrust line with respect to said predetermined direction to set such thrust line to extend through or substantially through the centre of gravity of the seat/airman combination.

The requirement for the thrust line of the rocket motor(s) to extend through or substantially through the centre of gravity of the seat/airman combination and also to be coincident or substantially coincident with the predetermined direction along which the seat leaves the aircraft necessitates the efflux from the rocket motor(s) being directed generally downwardly from beneath the seat pan.

The rocket motor(s) may, if desired, be mounted on the seat frame and have exhaust duct(s) extending under the seat pan to nozzle(s) arranged to direct the efflux in the required direction or, as is preferred, the rocket motor(s) may be mounted beneath the seat pan. The arrangement may include a single rocket motor of appropriate thrust capability or, as is preferred, the arrangement may include a pack of two or more rocket motors, each of low thrust capability but jointly providing the required thrust capability. The latter arrangement is preferred, especially in the case of mounting of the rocket motor beneath the seat pan, since a pack of small rocket motors jointly having the required thrust capability is more easily accommodated in the confined space available than is a single rocket motor of the required thrust capability.

Thus, in preferred embodiments of the invention, an ejection seat is provided beneath its seat pan with a pack of rocket motors having arrangements for simultaneous firing of the motors and having a common exhaust system, means responsive to the weight and position of the centre of gravity of the airman during ejection of the seat/airman combination being provided to move the pack of rocket motors, and/or the exhaust system thereof, with respect to the seat pan so that the thrust line of the pack, whilst being maintained at least substantially aligned with the predetermined direction will automatically be so positioned as to intersect the centre of gravity of the seat/airman combination.

The exhaust system may consist of a single nozzle fed by all the rocket motors or, as is preferred since a more compact arrangement can be achieved thereby, the exhaust system may comprise a plurality of interconnected nozzles.

Preferably said rocket motor(s), or at least the exhaust system thereof, will normally be set so that the resultant thrust line of the rocket motor(s) passes through the centre of gravity of a seat/airman combination including an airman considerably lighter than average, whereby the adjustment means will always effect any required adjustment of thrust line position by movement in a single direction, i.e. forwardly in the usual case since the position of the centre of gravity of the seat/airman combination is normally further towards the back of the ejection seat with a light airman than that of a heavy airman.

Very conveniently, said adjustment means may comprise a platform pivotally connected to said seat at a point nearer the back of the seat than the rearmost position of the centre of gravity of any airman likely to use the seat, said platform being adapted to carry the weight of the airman when he is seated in the ejection seat and being adapted to rock about its pivotal connection to said seat against the action of spring-biassing means under the load applied to such platform by the airman during acceleration of the seat/airman combination by the operation of the ejection gun. It will be understood that with such arrangement the deflection of the platform under such load will be determined by the moment of such load about the pivotal connection of the platform to the seat and will therefore depend not only upon the weight of the airman but also upon the position of his centre of gravity relative to said connection.

The said spring-biassing means are desirably of such a nature that deflection of the platform (and the consequential movement of the rocket motor(s) thrust line) only takes place when the platform is subjected to substantial loads such as the load of an airman when subject to the acceleration induced by operation of the ejection gun.

In order that the invention may be more readily understood one embodiment of ejection system in accordance with this invention will now be described by way of example and with reference to the accompanying drawing which is a side view of an ejection seat including such ejection system with an airman seated therein, the said ejection seat and airman being shown diagrammatically. In this embodiment the ejection seat is generally designated 1 and includes a seat pan 2 mounted on a seat frame 3 associated wtih a telescopic ejection gun 4 of conventional construction, the gun 4 being adapted, on operation, to eject the seat 1 from the aircraft to which it is fitted so that the seat 1 on leaving the aircraft initially follows a path that is somewhat rearwardly inclined with respect to the vertical datum of the aircraft.

Positioned in the base of the seat pan 2 is a forwardly and upwardly inclined platform 5, said platform 5 being pivotally secured along its rear edge to the seat pan 2 of ejection seat 1 for angular or rocking movement in a vertical direction about a pivot pin 6. The pivotal connectio of the platform 5 to the seat pan 6 lies at a point behind a line parallel to the thrust line of the ejection gun 3 and also lies behind the rearmost estimated position of the centre of gravity of any airman likely to use the seat.

The end of the platform remote from the pivot pin 6 carries a bracket 7 having a slot 8 in which a pin 9 on one arm 10 of a substantially L-shaped bell-crank lever 11 rides. Such lever 11 is pivotally connected at 12 to the ejection seat 1 in the vicinity of the front face of the seat pan 2, the other arm 13 of the bell-crank lever 11 being connected to a rocket motor pack generally designated 14 mounted beneath the seat pan 2 for movement forwardly with respect to the seat 1.

Such connection of the arm 13 and rocket pack 14 is enabled by means of a slot 15 on the arm 13 locating a transverse pin 16 passing through a rod 17. The said rod 17 enters a cylindrical sleeve 18 fixedly secured to the seat 1 and is secured to said pack 14. The said sleeve 18 and pack 14 serve to retain, partially compressed, a helical compression spring 19.

The spring 19 normally urges said pack 14 rearwardly so that the platform 5 and bell-crank lever 11 would be in the position shown in full lines in the accompanying drawing when no airman is seated in the seat 1.

The arrangement between the said platform 5 and the pack 14 is such that depression of the platform 5 causes the bell-crank lever 11 to rotate about its pivotal connection 12 to the ejection seat 1 and thereby causes forward linear movement of the rocket motor pack 14 against the action of the compression spring 19. Depression of said platform 5 (as a result of an airman sitting in the seat 1) causes the bell-crank lever to be rotated into the position shown in dot-and-pick lines in the accompanying drawing. Such movement will also cause the pack 14 to be moved forwardly into the position shown in dot-and-pick lines.

The rocket motor pack is of the general construction described in my said co-pending patent application Ser. No. 150,670 and includes a hollow spine 20 formed with exhaust nozzles 21 for the rocket motor efflux, the nozzles 21 being so orientated that the thrust line of the pack is parallel with the thrust line of the ejection gun 3. The movement of the pack relatively to the seat is linear so that this orientation of the pack thrust line is not disturbed by movement of the pack. The pack movement is limited by stops and, as has been stated hereinbefore, the spring 19 normally holds the pack in its rearmost position, in which the pack thrust line extends to the rear of the centre of gravity of the seat/airman combination when the seat is occupied by the lightest airman likely to use the seat. Such position is indicated in the accompanying drawing and is designated 22. The centre of gravity of the combination of the seat and the airman seated in the illustrated seat is illustrated and designated 23.

The helical compression spring 19 is preloaded and rated such that movement and depression of the pack 14 will not occur, during normal flight manoevres, as a result of the loads imposed on the platform 5 by an airman occupying the seat 1.

However, during ejection of the seat 1 from an aircraft by the ejection gun 3, the load on the platform increases as a result of the large acceleration forces transmitted to the airman to the platform 5 and such increased load is effective to depress the platform 5. The amount of depression depends on the moment of such load about the pivotal connection 6 of the platform 5 to the seat 1 and therefore depends both upon the weight of the airman and the position of the centre of gravity of the airman in the seat 1. The geometry of the arrangement and the rate of the spring-biassing are so interrelated that the rocket motor pack is moved, by the depression of the platform 5 under said load, forwardly by a sufficient amount to set the pack thrust line in a position to extend at least substantially through the then-existing centre of gravity of the seat/airman combination. Accordingly, the rocket thrust line is automatically set, during ejection of the combination, at least approximately in the most favourable position to achieve the required trajectory of the combination.

I claim:

1. An ejection system for ejecting an ejection seat/airman combination from an aircraft, comprising an ejection gun for effecting initial ejection of the combination from the aircraft in a predetermined direction relatively to the aircraft and at least one rocket motor independent of said ejection gun for accelerating the combination in said predetermined direction by producing a thrust vector aligned or substantially aligned with said predetermined direction and means responsive to the weight and position of the centre of gravity of the airman during ejection of the combination for automatically adjusting the position of the thrust line of the rocket motor with respect to the ejection seat whilst maintaining the orientation of the thrust line with respect to said predetermined direction to set such thrust line to extend through or substantially through the centre of gravity of the seat-airman combination.

2. An ejection system according to claim 1, wherein said rocket motor is mounted on the seat frame, said rocket motor including at least one exhaust duct and a nozzle connected to said duct, said nozzle being arranged to direct the efflux from the rocket motor in the required direction.

3. An ejection system according to claim 1, wherein said rocket motor is mounted beneath the seat pan.

4. An ejection system according to claim 1, wherein a single rocket motor is provided.

5. An ejection system according to claim 1, wherein a pack of rocket motors is provided.

6. An ejection system for ejecting an ejection seat/airman combination from an aircraft, comprising an ejection gun for effecting initial ejection of the combination from the aircraft in a predetermined direction relatively to the aircraft, a pack of rocket motors provided beneath the seat pan of said seat, the rocket motors of said pack having a common exhaust system, adjustment means responsive to the weight and position of the centre of gravity of the airman during ejection of the seat-airman combination being provided to move at least the exhaust system of the pack of rocket motors with respect to the seat pan so that thrust line of the pack, whilst being maintained at least substantially aligned with the predetermined direction, will automatically be so positioned as to intersect the centre of gravity of said seat-airman combinaton.

7. An ejection system according to claim 6, wherein said exhaust system comprises a plurality of interconnected nozzles.

8. An ejection system according to claim 6, wherein at least the exhaust system of said pack of rocket motors is set so that normally the resultant thrust line of the pack passes through the centre of gravity of a seat/airman combination including an airman considerably lighter than average, whereby said adjustment means will effect any required adjustment of thrust line position by movement of said exhaust system in a single direction.

9. An ejection system for ejecting an ejection seat/airman combination from an aircraft, comprising an ejection gun for effecting initial ejection of the combination from the aircraft in a predetermined direction relatively to the aircraft and at least one rocket motor independent of said ejection gun for accelerating the combination in said predetermined direction by producing a thrust vector aligned or substantially aligned with said predetermined direction and means responsive to the weight and position of the centre of gravity of the airman during ejection of the combination for automatically adjusting the position of the thrust line of the rocket motor with respect to the ejection seat whilst maintaining the orientation of the thrust line with respect to said predetermined direction to set such thrust line to extend through or substantially through the centre of gravity of the combination, said means responsive to the weight and position of the centre of gravity of an airman seated in said seat comprising a platform adapted to carry the weight of the airman when he is seated in said seat, a pivotal connection between said platform and said seat at a point nearer the back of the seat than the rearmost position of the centre of gravity of any airman likely to use the seat permitting said platform to rock with respect to said seat, spring-biassing means being provided to resist movement of said platform, rocking movement of said platform causing the thrust line of said rocket motor to be adjusted.

10. An ejection system according to claim 9, wherein said spring-biassing means are of such a nature that deflection of the platform only takes place when the platform is subjected to substantial loads such as the load transmitted by an airman to said platform when such airman is subjected to the acceleration induced by the operation of the ejection gun.

No references cited.

MILTON BUCHLER, *Primary Examiner.*

B. BELKIN, *Assistant Examiner.*